United States Patent [19]

Crapanzano

[11] Patent Number: 4,709,223

[45] Date of Patent: Nov. 24, 1987

[54] ANTISKID SYSTEM MONITORING CIRCUIT

[75] Inventor: Angelo T. Crapanzano, Akron, Ohio

[73] Assignee: Loral Corporation, New York, N.Y.

[21] Appl. No.: 814,833

[22] Filed: Dec. 30, 1985

[51] Int. Cl.$^4$ .............................................. B60Q 1/00
[52] U.S. Cl. .................................. 340/52 B; 303/102; 73/121
[58] Field of Search ............... 340/52 B, 52 C, 146.2, 340/511, 657; 73/39, 121–132; 361/238; 364/426, 487, 483, 552; 303/98, 102–111

[56] References Cited

U.S. PATENT DOCUMENTS

| | | | |
|---|---|---|---|
| 4,361,825 | 11/1982 | Shockley | 340/52 C |
| 4,368,641 | 1/1983 | McLeod | 364/552 |
| 4,468,740 | 8/1984 | Beck et al. | 364/426 |

Primary Examiner—Charles A. Ruehl
Assistant Examiner—Brian R. Tumm
Attorney, Agent, or Firm—P. E. Milliken; R. L. Weber

[57] ABSTRACT

An efficiency monitor circuit for an antiskid system is provided. The efficiency of the antiskid system is determined by monitoring the antiskid signal as to peak positive and peak negative moves thereof. The difference in these two signals corresponds to the efficiency of the antiskid system. This difference signal is compared to a threshold signal for comparison of the efficiency to a signal corresponding to an acceptable minimum value. Should the efficiency of the antiskid system fail to meet the minimum value, an alarm is activated.

6 Claims, 1 Drawing Figure

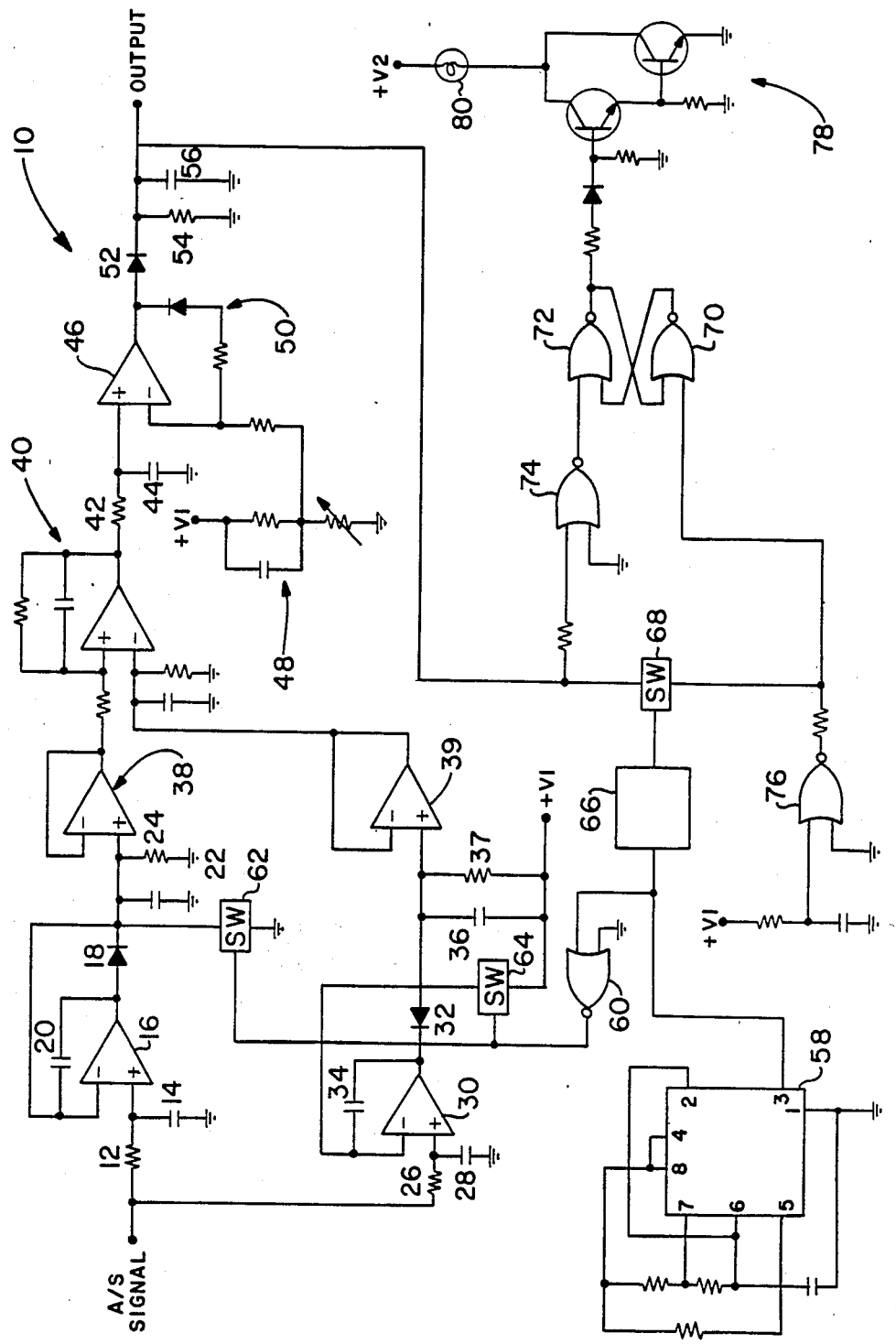

ANTISKID SYSTEM MONITORING CIRCUIT

TECHNICAL FIELD

The invention herein resides in the art of braking systems and, more particularly, to braking systems which include an antiskid system as a portion thereof. The invention comprises an efficiency monitor for an antiskid system, indicating to an operator that an unacceptable efficiency level in the antiskid system has been experienced.

BACKGROUND ART

Heretofore, various types of antiskid systems have been known as used in aircraft and land vehicles. While antiskid systems presently include testing circuitry for testing the operability of the various circuit elements prior to touch-down, such systems basically only monitor whether or not the particular elements of the antiskid system are functional. There is no known means for monitoring the efficiency of the antiskid system to determine whether or not its operation has degraded or become inefficient to the extent that repairs are necessary.

Specifically, presently known monitors for antiskid systems do not include a means for determining whether or not a filter is clogging or a valve is hanging-up. In substance, there is no known method for determining the efficiency of operation of an antiskid system to determine when components thereof have degraded to the point where service is necessary.

DISCLOSURE OF THE INVENTION

In light of the foregoing, it is a first aspect of the invention to provide an antiskid system efficiency monitor circuit wherein the overall operating efficiency of the antiskid system is monitored in actual braking operation.

Another aspect of the invention is the provision of an antiskid system efficiency monitor circuit wherein the degradation of the antiskid system as a whole may be sensed and monitored.

Yet an additional aspect of the invention is the provision of an antiskid system efficiency monitor circuit in which the efficiency of the antiskid system in operation may be compared against a preset level to warn the user when the efficiency thereof is below such level.

Yet an additional aspect of the invention is to provide an antiskid system efficiency monitor circuit which is readily implemented with existing antiskid systems and which may be implemented in digital or analog form.

The foregoing and other aspects of the invention which will become apparent as the detailed description proceeds are achieved by an antiskid system efficiency monitor circuit, comprising: first and second peak detectors receiving an antiskid signal and respectively generating therefrom positive peak signals and negative peak signals corresponding to maximum positive and negative excursions of said antiskid signal; a differential amplifier receiving said positive and negative peak signals and generating a differential signal corresponding to the difference between said positive and negative peak signals; and a threshold detector receiving said differential signal and producing an output signal when said differential signal exceeds a particular level.

Yet other aspects of the invention are attained by an antiskid system efficiency monitor circuit, comprising: first means for receiving an antiskid signal and generating therefrom a differential output corresponding to the difference between positive and negative swings of said antiskid signal; second means connected to said first means for receiving said differential output and generating an efficiency output signal should said differential output exceed a particular level; and third means connected to said second means for receiving said efficiency output signal and generating an indicia that the efficiency of the antiskid system is below an acceptable level.

DESCRIPTION OF THE DRAWING

For a complete understanding of the objects, techniques, and structure of the invention reference should be had to the following detailed description and accompanying drawing wherein there is shown a circuit schematic of the antiskid system efficiency monitor circuit according to the invention.

BEST MODE FOR CARRYING OUT THE INVENTION

With reference to the drawing, it can be seen that an antiskid efficency monitor circuit is designated generally by the numeral 10. An input resistor 12 and a filter capacitor 14 receive an antiskid signal and pass the same to the amplifier 16. It will be understood that the antiskid signal would typically be that signal generated by the antiskid system and adapted to be applied to the antiskid valves. The output of the amplifier 16 is passed through a forward bias diode 18 and fed back via a feedback capacitor 20. It will readily be understood by those skilled in the art that the elements 12–20 act as a high or positive peak detector, the output of the diode 18 being positive going signals which are used to charge the capacitor 22 to receive the positive going peak of the antiskid signals. A discharge resistor 24 is connected in association with the capacitor 22 to provide a discharge path to ground.

An input resistor 26 and filter capacitor 28 are provided in association with the amplifier 30 for also receiving the antiskid signal which is applied to the amplifier 16. The output of the amplifier 30 is passed through a reverse bias diode 32 and includes a feedback capacitor 34. A charging capacitor 36 is provided to receive the output signal from the diode 32 with appropriate discharge through the resistor 37 which, as shown, is connected to the positive voltage +V1. As discussed above, the elements 26–34 act as low or negative peak detectors which charge the charging capacitor 36 with the discharge path through the resistor 37. Accordingly, the capacitors 22,36, at any point in time, respectively contain a charge indicative of the positive and negative perturbations of the antiskid signal. The outputs of the capacitors 22,36 are applied to buffer amplifiers 38,39, the outputs of which are then applied to a differential amplifier 40 which presents an output corresponding to the amplitude of the differential between the high and low voltages of the capacitors 22,36. The output of the differential amplifier 40 is supplied through a resistor 42 to a capacitor 44, the resistor-capacitor arrangement providing a time constant for building up a charge on the capacitor 44.

A threshold amplifier 46 is connected to the capacitor 44 to receive the voltage signal therefrom and to compare the same to a voltage reference as set by the circuit 48. It will be noted that the circuit 48 includes a variable resistor to allow the operator to adjust the circuit connected to the negative input of the amplifier 46 to set the threshold of the circuit. It will be understood that the reference circuit 48 is adjusted to a voltage corresponding to the maximum unacceptable efficiency of the antiskid system. It will also be noted that a hysteresis feedback circuit 50 is provided to prevent the output of the amplifier 46 from toggling back and forth when the input at the positive input is substantially equivalent to the reference at the negative input. The output of the threshold amplifier 46 is passed through a diode 52 to a resistor 54 and capacitor 56. The circuit 54,56 is designed to have a high time constant such that it builds up a charge from the output of the threshold amplifier 46 as a function of the amount of time that the output of the circuit 40 exceeds the threshold of the circuit 48.

A timer 58 is provided with the output comprising a train of pulses of predetermined frequency. The output of the timer 58 is passed through the inverter 60 as a train of pulses to the switches 62,64. The switches 62,64, repeatedly turned on at the frequency of the output of the timer 58, serve to discharge the capacitors 22,36 on a fixed periodic basis set by the output of the timer 58. Effectively, the timer 58 sets the sampling rate of the capacitors 22,36 of the peak outputs of the positive and negative peak detector amplifiers 16,30. The output of the timer 58 triggers a one-shot 66, the one-shot 66 producing output signals of fixed time duration at a frequency substantially less than that of the output of the timer 58. The one-shot 66 establishes the monitoring rate of the system.

A switch 68 receives the voltage of the capacitor 56 and gates that voltage to an input of the NOR gate 70 of the latch comprising NOR gates 70,72. The output of the capacitor 56 is also applied to the input of the NOR gate 74. It will be appreciated that the output of the latch 70,72 is low except when the output or voltage of the capacitor 56 is high and switch 68 is activated by the one-shot 66. It will also be noted that a gate 76 is provided to achieve the proper state of the latch 70,72 when power is turned-on.

The output of the latch 72 is applied to a Darlington circuit 78 which is adapted to drive the lamp 80, advising the pilot or operator that the efficiency of the antiskid system has dropped below the threshold level set by the circuit 48 as determined from a sampling rate established by the output of the timer 58 and a monitoring rate established by the output of the one-shot 66.

It should, of course, be appreciated that the efficiency of an antiskid system is determined by measuring and averaging over a given period of time the fluctuation between the maximum and minimum values of the antiskid signal. It will be understood that the maximum signal corresponds to maximum drag on the mu-slip curve. These signals correspond to maximum efficiency. When the antiskid signal is at its lowest value, it corresponds to its minimum efficiency, for braking at that point is at a minimum. Accordingly, by taking the difference between the positive and negative perturbations of an antiskid signal and comparing that difference with a set threshold corresponding to a minimum acceptable efficiency for the antiskid system, an output can be generated corresponding to the fact that the minimum efficiency has not been reached.

Thus it can be seen that the objects of the invention have been satisfied by the structure presented hereinabove. While in accordance with the patent statutes only the best mode and preferred embodiment of the invention has been presented and described in detail, the invention is not limited thereto or thereby. Accordingly, for an appreciation of the true scope and breadth of the invention reference should be had to the following claims.

What is claimed is:

1. An antiskid system efficiency monitoring circuit, comprising:
    first and second peak detectors receiving an antiskid signal and respectively generating therefrom positive peak signals and negative peak signals corresponding to maximum positive and negative excursions of said antiskid signal, said positive and negative peak signals charging respective first and second holding circuits;
    means for discharging said first and second holding circuits at a first fixed frequency;
    a differential amplifier receiving said positive and negative peak signals and generating a differential signal corresponding to the difference between said positive and negative peak signals; and
    a threshold detector receiving said differential signal and producing an output signal when said differential signal exceeds a particular level, said output signal of said threshold detector being fed to charge a third holding circuit, said charge on said third holding circuit being periodically gated to a latch at a second fixed frequency less than said first fixed frequency.

2. The antiskid system efficiency monitor circuit according to claim 1 wherein said particular level associated with said threshold detector corresponds to a minimum acceptable efficiency for said antiskid system.

3. The antiskid system efficiency monitor circuit according to claim 1 which further comprises alarm means connected to said latch for generating an alarm signal indicating that efficiency of said antiskid system is below a minimum acceptable efficiency.

4. An antiskid system efficiency monitor circuit, comprising:
    first means for receiving an antiskid signal and generating therefrom a differential output corresponding to the difference between positive and negative swings of said antiskid signal;
    second means connected to said first means for receiving said differential output and generating an efficiency output signal should said differential output exceed a particular level;
    third means connected to said second means for receiving said efficiency output signal and generating an indicia that the efficiency of the antiskid system is below an acceptable level;
    wherein said first means comprises positive and negative peak detectors, outputs of which are passed to respective first and second charging circuits, first and second switches respectively connected to said first and second charging circuits, said first and second switches being operative to discharge said first and second charging circuits at a first fixed frequency, and a differential amplifier receiving outputs from said positive and negative peak detectors; and
    wherein said third means comprises a latch, under control of a switch, said switch gating the output signal of said second means to said latch at a second fixed frequency, less than said first fixed frequency.

5. The antiskid system efficiency monitor circuit according to claim 4 wherein said second means comprises a threshold detector, presenting said efficiency output signal when said differential output exceeds said particular level.

6. The antiskid efficiency monitor circuit according to claim 4 wherein said latch is connected to and drives a lamp circuit for generating said indicia.

* * * * *